(12) United States Patent
Baker

(10) Patent No.: US 6,373,647 B1
(45) Date of Patent: Apr. 16, 2002

(54) METHOD OF SELF-TESTING MAGNETO-RESISTIVE HEADS FOR INSTABILITY IN A DISK DRIVE

(75) Inventor: Bill R. Baker, Redwood City, CA (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 09/439,777

(22) Filed: Nov. 12, 1999

(51) Int. Cl.$^7$ .................................................. G11B 5/02
(52) U.S. Cl. .............................. 360/25; 360/31; 360/46
(58) Field of Search ............................ 360/25, 31, 53, 360/27, 78.14, 46, 101, 99.11, 74.4; 324/113, 207.21

(56) References Cited

U.S. PATENT DOCUMENTS 6,175,457 B1 * 1/2001 Flynn .......................... 360/46
6,249,392 B1 * 6/2001 Sacks et al. .................. 360/31

* cited by examiner

Primary Examiner—Regina Y. Neal
Assistant Examiner—Son H. Nguyen
(74) Attorney, Agent, or Firm—David M. Sigmond

(57) ABSTRACT

An MR head self-testing method is provided to test for instability in MR heads incorporated with a hard disk drive. A first method is carried out with the disk rotating and includes positioning the MR head over a rotating magnetic storage disk and controlling the MR head to read from erased data fields defined on the disk. This read signal is filtered and conditioned according to preprogrammed filter coefficients contained in an FIR filter to provide an exaggerated read error signal. The exaggerated read error signal is provided to a digital comparator and counter circuit for detecting and counting voltage baseline jumps that exceed preprogrammed positive and/or negative threshold values. The counted positive and negative voltage baseline jumps, which are indicative of MR head instability, are provided to an error diagnostic register for analysis. If the error diagnostic register contains single polarity voltage baseline jumps, the voltage baseline jumps may be caused by thermal asperities on the disk. If the error diagnostic register contains both positive and negative voltage baseline jumps, the voltage baseline jumps may be caused by MR head instability. A second method is carried out with the disk stationary so there is no opportunity for thermal asperities to generate baseline jumps. Possible instabilities can only be of the Barkhausen noise or dielectric breakdown types.

25 Claims, 5 Drawing Sheets

METHOD OF SELF-TESTING MAGNETO-RESISTIVE HEADS FOR INSTABILITY IN A DISK DRIVE

FIELD OF THE INVENTION

The invention relates generally to hard disk drives and more precisely to a method of self-testing magneto-resistive heads for instability after the heads have been incorporated in a hard disk drive.

BACKGROUND OF THE INVENTION

In hard disk drives, data is written to and read from magnetic recording media, herein called disks, utilizing magneto-resistive transducers commonly referred to as MR heads. Typically, one or more disks are rotatably mounted on a spindle. An MR head, mounted on an actuator arm, is positioned in close proximity to the disk surface to write data to or read data from the disk surface.

During operation of the disk drive, the actuator arm moves the MR head to a desired radial position on the surface of the rotating disk where the MR head electromagnetically writes data to the disk and senses magnetic field signal changes to read data from the disk. Usually, the MR head is integrally mounted in a carrier or support referred to as a "slider". A slider generally serves to mechanically support the MR head and any electrical connections between the MR head and the disk drive. The slider is aerodynamically shaped, which allows it to fly over and maintain a uniform distance from the surface of the rotating disk. In typical disk drives, contact between the MR head and disk is extremely undesirable.

Typically, a slider is formed with two or more parallel rails with a recessed area between the rails and with each rail having a ramp at one end.

The surface of each rail that glides over the disk surface during operation is known as the air-bearing surface.

An MR head typically includes an MR read element that reads recorded data, and an inductive electromagnetic element that writes the data. Both the MR read element and inductive electromagnetic element terminate at the air-bearing surface.

To manufacture MR heads, rows of MR heads are deposited simultaneously on the surface of a semiconductor wafer using known semiconductor process methods. After deposition of the MR heads is complete, bars are sliced from the wafer, each bar comprising a row of units which can be further processed into sliders having one or more MR heads on their end faces. Each bar is bonded to a fixture where the bar is further processed and then diced, or separated, into individual sliders, each slider having at least one MR head terminating on the slider's air bearing surface.

To achieve maximum efficiency from MR heads, dimensions near the pole tips must be especially carefully controlled. Two of these dimensions are the "throat height" for thin film inductive electromagnetic elements and the "MR read element height" in the case of MR read elements, which must be maintained within a certain limited tolerance for generating the maximum signal from a given MR head element. During row bar processing, it is critical to grind or lap the bar to the desired thickness to achieve the desired throat height and MR element height.

Conventional lapping processes utilize either oscillatory or rotary motion of the work piece (i.e., the row bar) across either a rotating or oscillating lapping plate to move the work piece randomly over the lapping plate thereby randomizing plate imperfections across the MR head surface caused by the lapping process. During the lapping process, the motion of abrasive grit carried on the surface of the lapping plate is typically transverse to the MR head elements exposed at the slider air-bearing surface. In MR heads, the electrically active components as well as other magnetic components exposed at the air-bearing surface are made of relatively soft materials. During the lapping process, these soft conductive components can scratch and smear over insulator layers in the read gap creating electrical shorts or effectively narrowing the read gap so that electrical leakage can cause unstable performance of the MR head.

It is also known that for an MR head to function effectively, it must be subjected to a transverse bias field to linearize its response to magnetic field signal changes. Various transverse biasing techniques are known including current shunt, "barber pole" and soft adjacent film biasing. The transverse bias field is applied normal to the plane of the magnetic media and parallel to the surface of the MR head.

It is also known that an MR head may be utilized with a longitudinal bias field extending parallel to the surface of the magnetic media and parallel to the major axis of the MR head. Stabilization of MR heads by means of a longitudinal bias field is necessary to suppress Barkhausen noise if the MR heads are used in high track density disk drives. Barkhausen noise results from unstable magnetic properties such as multi-domain states (or domain walls) within the MR read element portion of the MR head which may appear or move following a magnetic disturbance from the associated inductive electromagnetic element portion of the MR head or other external magnetic field source.

With respect to the last problem, MR read elements are commonly stabilized with ferromagnetic materials such as ferromanganese or a permanent magnet layer comprising cobalt platinum, cobalt platinum tantalum or cobalt platinum chromium in order to obtain a single magnetic domain state throughout the MR element. Stabilizing the MR read element with a ferromagnetic layer is commonly referred to as pinning the off-track boundaries of the MR read element. However, the effectiveness of such boundary bias methods diminishes in the center of the MR read element due to the fact that magnetic flux rapidly leaks out of the MR read element as the distance to the boundary of the MR read element increases. This undesired flux leakage is one common cause of multi-domain states and associated Barkhausen noise on reading data, resulting in MR head instability problems.

During the deposition of the MR read element layers, pinholes, defects and contaminant particles can be formed in the insulation layers, which results in dielectric breakdown. The electrical conductivity of such layers may suddenly increase in sporadic and unexpected ways to change the apparent resistance of the MR read element. These unexpected changes in resistance of the MR read element contribute to MR head instability. (See B. R. Baker, "ELECTROSTATIC POPPING IN AMR AND GMR HEADS", IEEE Trans. Mag., vol. 35, pp. 2583–2885, 1999.)

MR head instability caused by Barkhausen noise and dielectric breakdown results in sudden voltage baseline jumps in the read back waveform. This can adversely affect the data error rate in the read channel and more seriously affect the servo positioning feedback system of the head positioner incorporated with the disk drive. In other words, MR head instability seriously affects the disk drive's ability to position the MR head over the recorded data on the disk surface correctly, and thus making reliable reading of the recorded data impossible.

Another cause of voltage baseline jumps in the read back signal occurs from the impact of the MR head with a small bump projecting from the disk surface. These bumps are known as thermal asperities. When an MR head strikes a thermal asperity there is usually a rapid transfer of energy and associated temperature rise near the impact area. If the MR head's temperature changes abruptly as a result of striking a thermal asperity, then its resistance also rises rapidly causing the read signal to exhibit a voltage baseline jump with a decaying tail. These voltage baseline jumps resemble those caused by Barkhausen noise or dielectric breakdown, but the thermal asperities give voltage baseline jumps of only one polarity, depending on the connections between the MR head and preamplifier.

Disk drives containing disks with a small number of thermal asperities are usable because areas on the disks containing the thermal asperities can be avoided during use of the disk drive. Disk drives containing MR heads with dielectric breakdown or Barkhausen noise may not be usable because there is no practical way to avoid using the MR heads contained in the disk drive. Voltage baseline jumps generated by Barkhausen noise, dielectric breakdown or thermal asperities are very similar, making it difficult to distinguish between them and thus making it difficult to determine if a disk drive exhibiting the voltage baseline jumps can be reliably used.

Thus, a hitherto unsolved need has remained for a method of testing MR heads to identifying and distinguishing between MR heads exhibiting voltage baseline jumps resulting from intermittent instability problems associated with Barkhausen noise, dielectric breakdown or thermal asperities.

SUMMARY OF THE INVENTION

An objective of the present invention is to provide a self-test method for an MR head incorporated within a hard disk drive ("HDD"). The self-test method is used to determine if voltage baseline jumps are present in the read back signal sensed by the MR head and if such voltage baseline jumps are caused by MR head magnetic instability (Barkhausen noise), dielectric breakdown, or contact with the disk at a thermal asperity. Because this is a self-test method carried out by the disk drive's electronics and firmware, it can be done during initialization and burn-in at the factory.

The MR head self-testing method, according to a first embodiment of the present invention, comprises spinning up the disk drive incorporating the MR head, enabling the MR head to fly over the disk, in close proximity thereto. A suspension assembly, which supports the MR head over the rotating storage disk, is controlled to move the MR head over a track of the disk that can be used for testing ("test track"). Any previously written data in the data fields is erased. The MR head is controlled to sense a read signal from the data fields on the test track. The read signal is provided to a first filter, where the first filter conditions the read signal by removing high frequency noise from the read signal. The filtered read signal is provided to a second filter, where the second filter further conditions the filtered read signal using preprogrammed filter coefficients contained in the second filter. The read error signal provides exaggeration to any voltage baseline jumps originally present in the filtered read signal. The read error signal is applied to a digital comparator and counter circuit. The digital comparator and counter circuit detects and counts each positive and each negative voltage baseline jump in the read error signal according to preprogrammed positive and negative voltage threshold values contained in the digital comparator and counter circuit. The detected values of the counter, which represents the detected positive and negative voltage baseline jumps, is stored in an error diagnostic register for analysis. If the error diagnostic register contains values indicative of voltage baseline jumps of a single polarity, the voltage baseline jumps may be caused by thermal asperities. If the error diagnostic register contains values indicative of both positive and negative voltage baseline jumps, then at least some of the voltage baseline jumps may be caused by Barkhausen noise or dielectric breakdown.

This self-test circuit and method enables the use of disk drives with thermal asperities while disqualifying disk drives with Barkhausen noise or dielectric breakdowns in the MR head.

These and other objects, advantages, aspects and features of the present invention will be more fully understood and appreciated upon consideration of the following detailed description of a preferred embodiment, presented in conjunction with the accompanying drawings.

BRIEF DESCRIPTION OF THE DRAWINGS In the drawings.

DETAILED DESCRIPTION OF A PREFERRED EMBODIMENT

Figure 1:
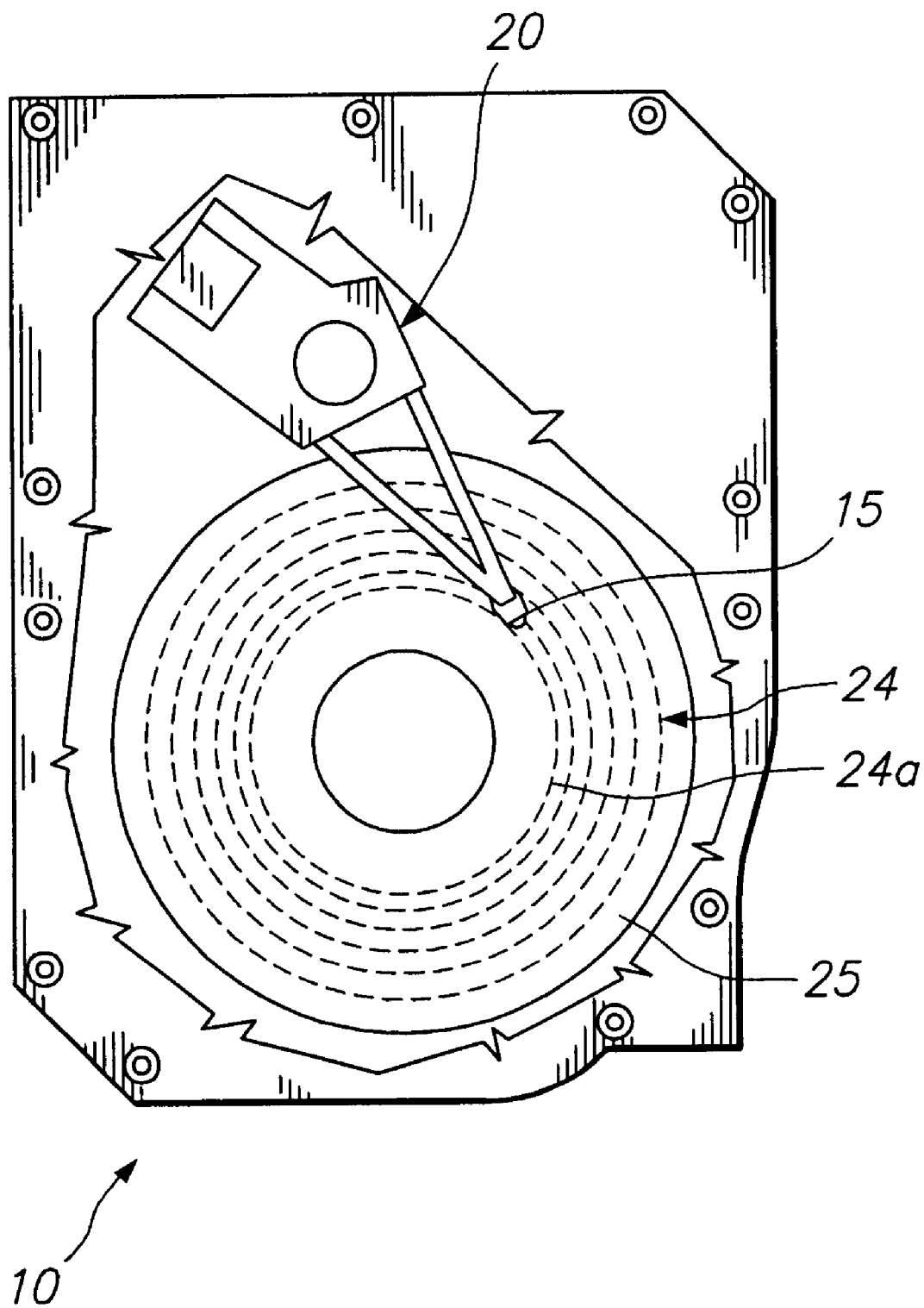
FIG. 1 is a simplified, cut-away, top plan view of a disk drive.

Referring to FIG. 1, a disk drive 10 incorporating MR head 15 is shown undergoing testing in accordance with principles of the present invention. MR head 15 is supported over rotating disk 25 by head actuator assembly 20. In testing MR head 15, MR head 15 is controlled to sense a read signal from test track 24a defined on rotating disk 25. Test track 24a can be arbitrarily selected from a plurality of data tracks 24 defined on rotating disk 25. The sensed read signal from test track 24a is processed to detect and count positive and negative read signal voltage baseline jumps indicative of instability in MR head 15.

Figure 2:
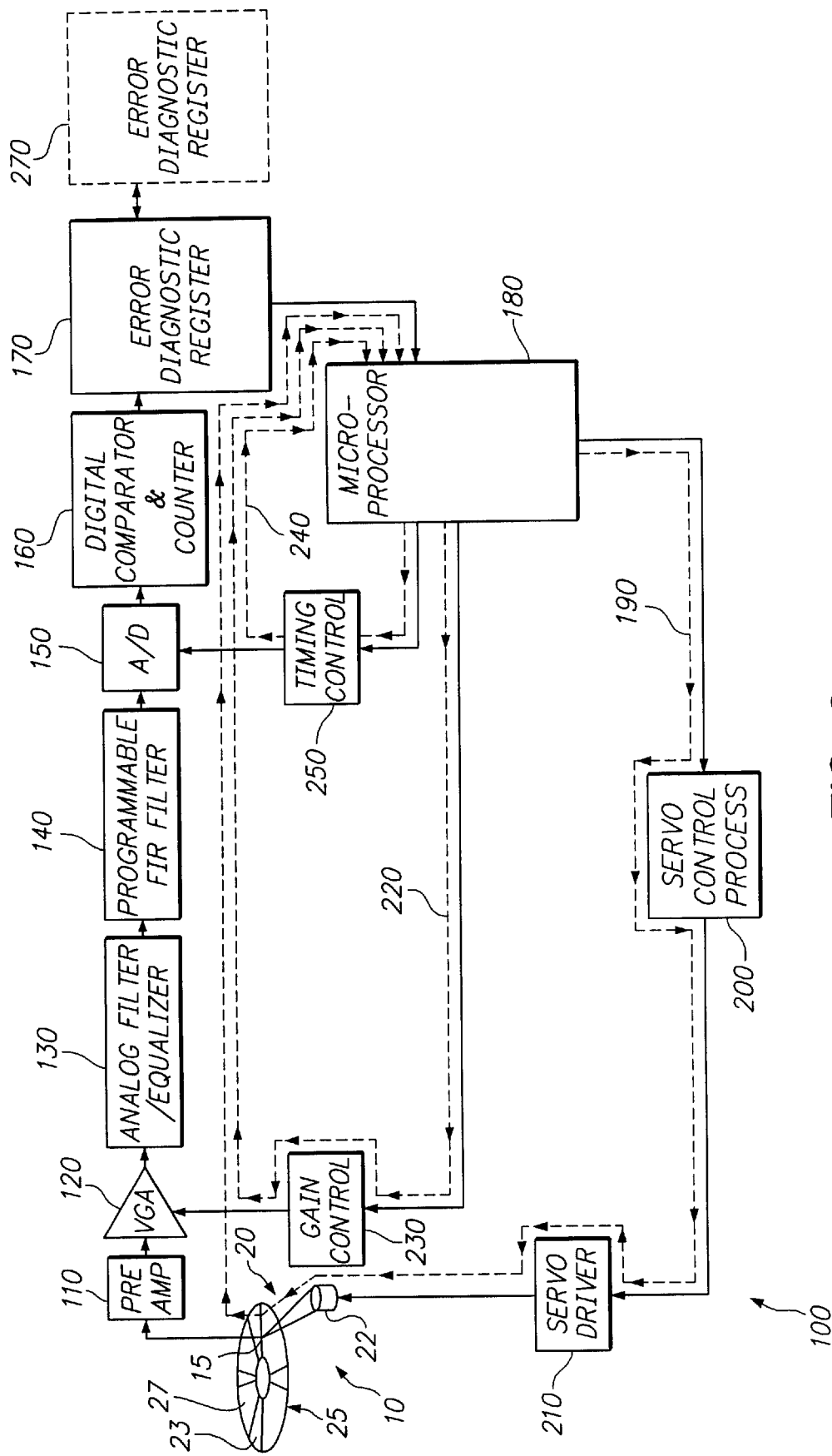
FIG. 2 is a block diagram of a sampling data detection channel having principles of the present invention.

Referring to FIG. 2, an embodiment of the present invention comprises a sampling data detection channel 100 that employs a programmable finite-impulse-response filter 140 ("FIR filter"). An example of a sampling data detection channel is shown in commonly owned U.S. Pat. No. 5,862,005, the disclosure of which is herein incorporated by reference. Sampling data detection channel 100 comprises a read preamplifier 110 coupled at its input to MR head 15 and at its output to a variable gain amplifier 120 ("VGA"). A programmable analog filter/equalizer circuit 130 is coupled to VGA 120's output and to FIR filter 140's input. An analog-to-digital converter 150 ("A/D") is coupled to FIR filter 140's output and to the input of digital comparator and counter circuit 160. The output of digital comparator and counter circuit 160 is coupled to an input of error diagnostic register 170. An output of error diagnostic register 170 is coupled to microprocessor 180.

Microprocessor 180 maintains a servo control loop 190 that includes a servo control process circuit 200 coupled at its input to microprocessor 180 and coupled at its output to a servo driver circuit 210. An output of servo driver circuit 210 is coupled to actuator voice coil motor 22 with MR head 15. servo control loop 190 further includes preamplifier 110, VGA 120, analog filter/equalizer 130, FIR filter 140, and A/D 150. Servo control loop 190 controls the positioning of voice coil motor 22 of head actuator assembly 20. Microprocessor 180 further maintains a gain control loop 220 that includes a gain control circuit 230 coupled at its input to microprocessor 180 and coupled at its output to VGA 120. Gain control loop 220 further includes 245 analog filter/equalizer 130, FIR filter 140, A/D 150, digital comparator and counter circuit 160 and error diagnostic register 170. Microprocessor 180 also maintains a timing control loop 240 that includes a timing control circuit 250 coupled at its input to microprocessor 180 and coupled at its output to A/D circuit 150. Timing control loop 240 further includes digital comparator and counter circuit 160 and error diagnostic register 170. Optionally, another error diagnostic register 270 is coupled with error diagnostic register 170 for storing error diagnostic data retrieved during repetitive MR head 15 tests. Data stored in error diagnostic register 170 and data stored in error diagnostic register 270 can be analyzed separately or comparatively.

During operation of sampling data detection channel 100, servo control loop 190 provides driving signals to actuator voice coil motor 22 both for moving MR head 15 from data track 24 (see FIG. 1) to test track 24a during track seeking operations and for correcting and maintaining MR head 15's position during test track 24a following operations (i.e. writing or reading operations). During reading, flux transitions sensed by MR head 15 as it flies over test track 24a are preamplified by read preamplifier circuit 110 (FIG. 2). The preamplified read signal (or "read signal") is then sent to VGA 120. VGA 120 may act independently, or in cooperation with gain control loop 220, to receive the analog signals from preamplifier circuit 110, where gain control circuit 230 is calibrated by a model or nominal read signal generated/stored in microprocessor 180 and then held constant during reading from test track 24a. After controlled amplification, the read signal is passed through programmable analog filter/equalizer circuit 130 to provide a filtered read signal. Analog filter/equalizer circuit 130 is programmed as a low pass filter with a cut off frequency ranging from approximately 500 KHz to approximately 2 MHz. The equalized or filtered analog read signal is subjected to further filtering and conditioning by programmable FIR filter 140. The output of FIR filter 140 generates an analog signal with exaggerated voltage baseline jumps or a read error signal. FIR filter 140 is programmed with filter coefficients that provide the analog read error signal with exaggerated voltage baseline jumps. One preferred form of FIR filter 140 is:

$$y_j = \sum_{k=1}^{k=N} c_k x_{j-k} \quad (1)$$

where $y_j$ is an output sample from FIR filter 140, $c_k$ are the tap weights or coefficients of FIR filter 140, and $x_{j-k}$ are discrete time samples taken from the output of analog filter/equalizer 130.

By way of example, if the sampling rate is high compared to the decay time (see FIG. 5), the output sample $y_j$ from FIR filter 140 may be formed as the difference of averages of the discrete time samples from the front and back halves of FIR filter 140 described above in equation (1). If N is even, for example N=2M, then equation (1) for FIR filter 140 is:

$$y_j = [(x_{j-1} + x_{j-2} + \ldots + x_{j-M}) - (x_{j-M-1} + x_{j-M-2} + \ldots + x_{j-2M})]/M \quad (2)$$

The preferred form of FIR filter 140 described in equation (2) averages a first predetermined number of discrete time samples to provide a first sample. The filter coefficients also averages a second predetermined number of discrete time samples to provide a second sample, the second sample is subtracted from the first sample to provide the read error signal with exaggerated voltage baseline jumps.

A/D circuit 150 receives the analog read error signal with enhanced voltage baseline jumps from FIR filter 140 and synchronously samples the analog read error signal via timing control circuit loop 240 to provide digitized read error samples. The digitized read error samples are provided to digital comparator and counter circuit 160. Digital comparator and counter circuit 160 detects both positive and negative voltage baseline jumps, which are contained in the digitized read error samples, that exceed preprogrammed threshold values. Each positive voltage baseline jump that exceeds the preprogrammed threshold value is detected and counted to increment a positive voltage baseline jump counter value. Also, each negative voltage baseline jump that exceeds the preprogrammed threshold value is detected and counted to increment a negative voltage baseline jump counter value. The positive voltage baseline jump counter value and negative voltage 310 baseline jump counter value are stored in error diagnostic registers 170 and/or 270 for subsequent analysis.

Figure 3:
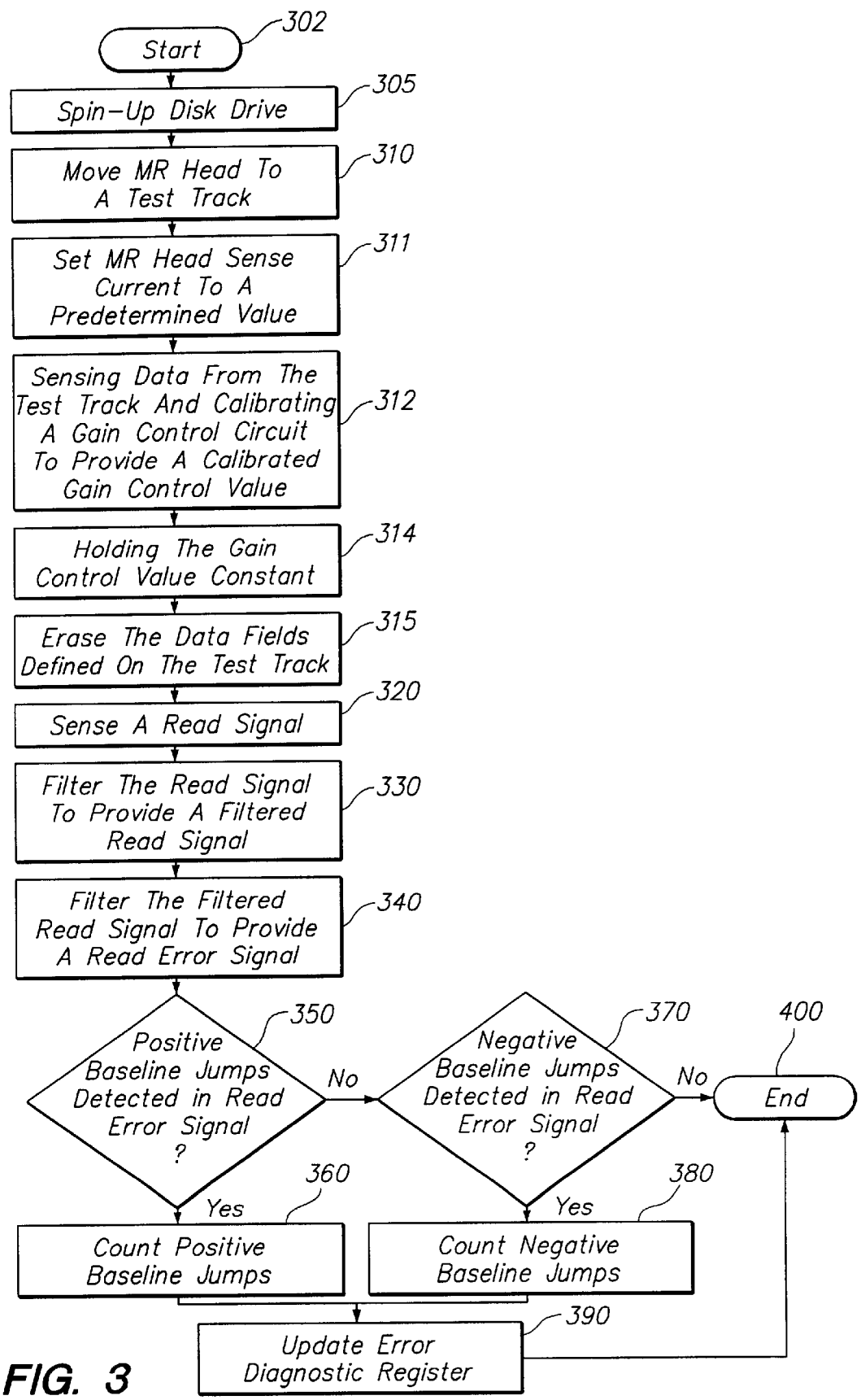
FIG. 3 is a flow chart illustrating the method of self-testing an MR head according to the present invention.

Referring to FIGS. 2 and 3, MR head 15 self-testing method 300 comprises starting at step 302 and spinning up disk drive 10 incorporating MR head 15 at step 305. At this instant, servo control loop 190 provides driving signals to actuator voice coil motor 22 for moving head actuator assembly 20 with MR head 15 to a test track 24a (FIG. 1) at step 310. At step 311, set MR head 15 sense current to a predetermined value ranging from approximately 4 milliamps to approximately 15 milliamps. This predetermined value may be a standard operating sense current or it can be approximately 25 percent higher in order to stress MR head 15 for a few minutes and to accelerate MR head 15 testing. MR head 15 is controlled to sense nominal test data from data fields 27 between servo fields 23 defined on test track 24a (FIG. 1) at step 312. At the same time, while sensing the nominal test data by MR head 15, gain control circuit 230 is calibrated to provide a gain control value for the sensed nominal data at step 312. The gain control value is held constant at step 314 and this constant gain control value is used for subsequently sensed data throughout the remaining test steps 315 through 400.

MR head 15 is controlled to erase all preexisting data from data fields 27 defined on test track 24a (FIG. 1) at step 315. At step 320, MR head 15 is controlled to sense a read signal from data fields 27 defined on test track 24a, which is subsequently preamplified by preamplifier 110. After the read signal is preamplified, the read signal is filtered by analog filter/equalizer circuit 130 at step 330 to provide a filtered read signal to FIR filter 140. The filtered read signal is filtered by FIR filter 140 at step 340 in accordance with the preprogrammed filter coefficients described above in equation (2) to generate the read error signal with exaggerated voltage baseline jumps, provided such voltage baseline jumps are actually present in the original read signal.

The read error signal can be provided directly to digital comparator and counter circuit 160. Alternatively, the read error signal can be directed to an analog comparator (not shown) whose output would trigger a counter circuit (not shown). Preferably, the read error signal is provided to A/D 150 for converting the read error signal to digitized read error samples.

Digital comparator and counter circuit 160 receives the read error samples from A/D 150 and detects positive voltage baseline jumps at step 350 and counts any detected positive voltage baseline jumps at step 360 that exceed a preprogrammed positive threshold value to provide a positive voltage baseline jump counter value. Digital comparator and counter circuit 160 further detects negative voltage baseline jumps at step 370 and counts any detected negative voltage baseline jumps at step 380 that exceed a preprogrammed negative threshold value to provide a negative voltage baseline jump counter value. Both the positive voltage baseline jump counter value and the negative voltage baseline jump counter value are stored in error diagnostic register 170 and/or 270 at step 390. MR head 15 self-testing method 300 then ends at step 400. If digital comparator and counter circuit 160 does not detect either positive or negative voltage baseline jumps in the digitized read error samples received from A/D 150 in steps 350 and 370 respectively, MR head 15 self-testing method 300 ends at step 400.

If error diagnostic register 170 and/or 270 contains a single polarity voltage baseline jump counter value, the voltage baseline jumps may be caused by thermal asperities on the disk 25. If error diagnostic register 170 and/or 270 contains both positive and negative voltage baseline jump counter values, the voltage baseline jumps must be caused by Barkhausen noise or dielectric breakdown of the MR head 15.

If voltage baseline jumps are determined to result from thermal asperities, the portion of disk 15 containing the thermal asperities is mapped out or not used for future data storage. Thus, disk drive 10 containing the thermal asperities can be approved for use. If voltage baseline jumps are determined to result from Barkhausen noise or dielectric breakdown (unstable MR head), and if such voltage baseline jumps are unacceptable, disk drive 10 containing unstable MR head 15 is not approved for use.

The above described MR head 15 self-testing method 300 can be repeated and the detected and counted positive and negative voltage baseline jump counter values can be accumulated in another diagnostic register 270. Both diagnostic registers 170 and 270 can be compared to determine if diagnostic data contained therein is a result of Barkhausen noise, dielectric breakdown or thermal asperities. Processor 180 can transfer the contents of diagnostic registers 170 and 270 to a history table contained in processor 180. A history of many MR head self-test results 300 carried out at different times and at different test tracks or portions of test tracks helps distinguish head-disk impacts from MR head instabilities and also provides reference conditions if an MR head begins to deteriorate.

Although not shown in the drawings, in a second embodiment, the MR head 15 self-testing method for detecting instability in MR head 15, while MR head 15 is incorporated within a hard disk drive 10 comprises setting MR head 15 sense current to the predetermined value described above at step 311. While the hard disk drive 10 remains static, a write current ranging from approximately 200 MHz to approximately 400 MHz is applied to an inductive electromagnetic element portion (not shown) of MR head 15 for a predetermined period of time. Immediately after switching off the write current, steps 320 through 400 described above are executed. Because the hard disk drive is static, detected baseline jumps cannot be caused by thermal asperities. Thus, detected and counted voltage baseline jumps may be caused by either Barkhausen noise or dielectric breakdown. If the number of detected and counted voltage baseline jumps is unacceptable, the hard disk drive 10 containing the MR head 15 under testing is not approved for use.

Figure 4:
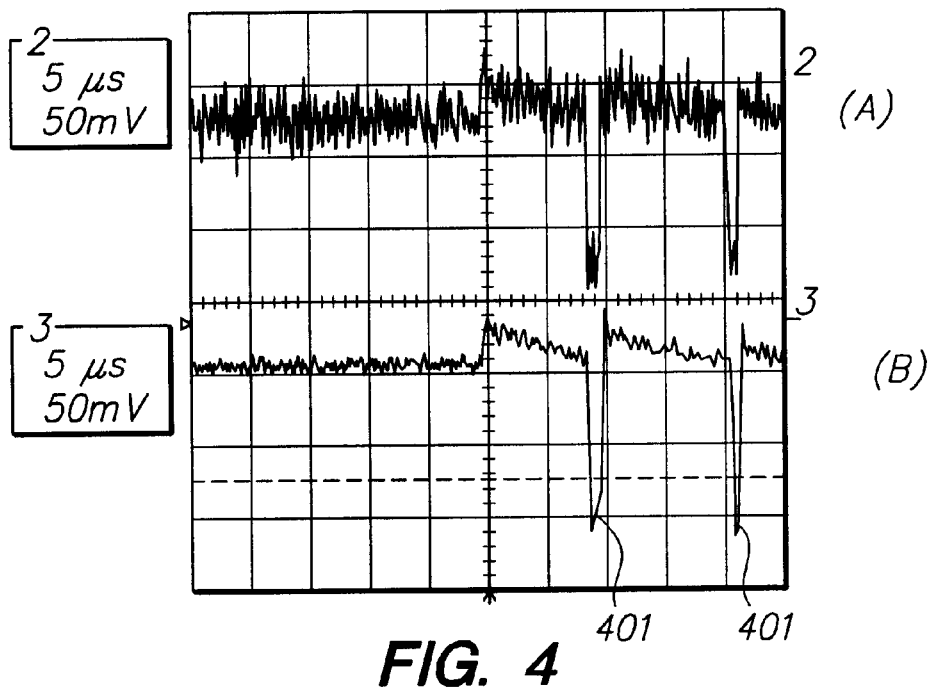
FIG. 4(a) is a graph of a read signal.
FIG. 4(b) is a graph of a filtered read signal provided by the first filter.

FIG. 4(A) is a graph showing the read signal sensed by MR head 15. In 405 FIG. 4(A), the read signal exhibits high frequency noise as well as voltage baseline jumps.

FIG. 4(B) is a graph showing the filtered read signal provided by analog filter/equalizer circuit 130. In FIG. 4(B), the high frequency content of the read signal shown in FIG. 4(A) has been filtered to suppress the high frequency electronic noise and to reveal the voltage baseline jumps 401.

Figure 5:
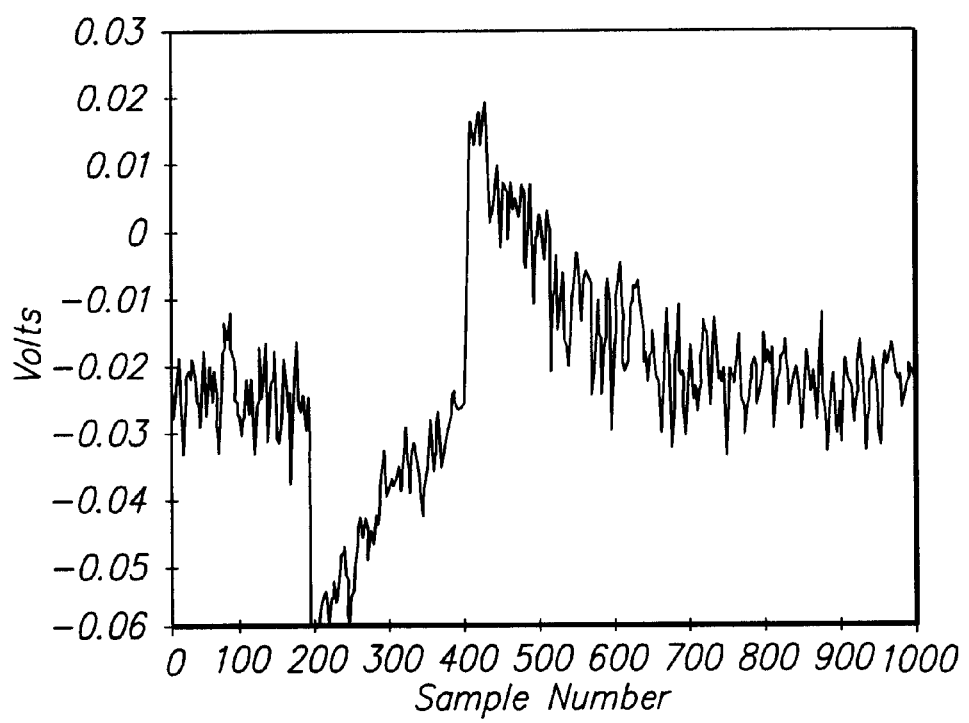
FIG. 5 is an enlarged view of a filtered read signal similar to that shown in FIG. 4(b)

FIG. 5 is a graph showing an enlarged view of a filtered read signal similar to that shown in FIG. 4(B) which exhibits an enlarged view of the 415 voltage baseline jumps.

Figure 6:
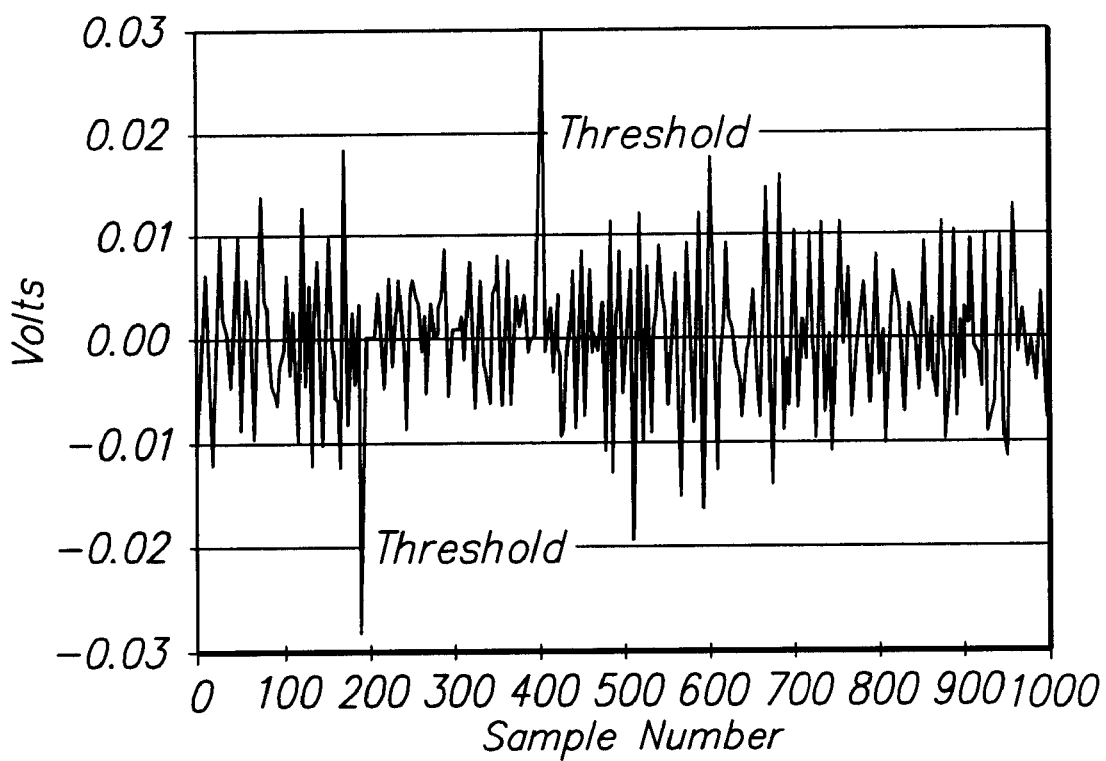
FIG. 6 is a graph of a read error signal provided by the second filter.

FIG. 6 is a graph showing the filtered read error signal generated by FIR filter 140. In FIG. 6, the voltage baseline jumps are further exaggerated to provide digital comparator and counter circuit 160 with a further exaggerated read error signal.

The above described MR head 15 self-testing method 300 incorporated within magnetic disk drive 10 has many advantages over the prior art, including preventing disk drive 10 with MR head 15 instability from being approved for use.

Having thus described an embodiment of the invention, it will now be appreciated that the objects of the invention have been fully achieved, and it will be understood by those skilled in the art that many changes in construction and widely differing embodiments and applications of the invention will suggest themselves without departing from the spirit and scope of the invention. The disclosure and the description herein are purely illustrative and are not intended to be in any sense limiting.

What is claimed is:

1. A method of self-testing the instability of an MR head incorporated in a hard disk drive, the hard disk drive including a rotatable disk having a number, of servo data fields containing head position data and a number of data fields, the method of self-testing the MR head comprising the steps of:

rotating the disk;

sensing a read signal with the MR head from erased data fields;

generating an error signal from the read signal;

detecting voltage baseline jumps in the error signal;

determining a polarity of each voltage baseline jump; and determining the existence of either thermal asperities or MR head instability based on whether the polarities of the voltage baseline jumps are single polarity or dual polarity.

2. The method of claim 1 wherein the step of sensing the read signal comprises the steps of:

setting MR head sense current to a predetermined value;

sensing a nominal data signal with the MR head from a test track and calibrating a gain control circuit to provide a calibrated gain control value;

holding the calibrated gain control value constant; and erasing data from data fields defined on the test track to provide the erased data fields.

3. The method of claim 1 wherein the step of generating the error signal comprises the step of filtering the read signal.

4. The method of claim 1 wherein the step of detecting voltage baseline jumps in the error signal and the step of determining the polarity of each voltage baseline jump comprises the step of providing the error signal to a digital comparator and counter.

5. The method of claim 4 wherein the voltage baseline jumps in the error signal indicate the existence of NM head instability.

6. The method of claim 1 wherein the step of determining the existence of either thermal asperities or MR head instability comprises the step of providing the voltage baseline jumps to an error diagnostic register.

7. The method of claim 6 wherein the thermal asperities exist if the error diagnostic register contains voltage baseline jumps of a single polarity.

8. The method of claim 7 wherein the MR head instability exists if the error diagnostic register contains both positive and negative polarity voltage baseline jumps.

9. A system in a disk drive for testing an MR head, the disk drive including a rotating data storage disk and an actuator assembly for positioning the MR head over a test track defined on the rotating data storage disk and reading a read signal from the test track, the system comprising:

a first filter for filtering the read signal;

a second filter for further filtering the filtered read signal to generate a read error signal;

an A/D converter for digitizing the read error signal;

a digital comparator and counter for detecting a polarity of voltage baseline jumps in the read error signal; and an error diagnostic register for providing a positive voltage baseline jump count in response to how many of the voltage baseline jumps are more positive than a positive threshold value and providing a negative voltage baseline jump count in response to how many of the voltage baseline jumps are more negative than a negative threshold value.

10. The system of claim 9 wherein the read signal is read from an erased data field defined on the test track.

11. The system of claim 10 wherein a calibrated gain control value from a gain control circuit is held constant while data is erased from data fields in the test track.

12. A method of self-testing the instability of an MR head incorporated in a hard disk drive, the hard disk drive including a rotatable disk having a number of servo data fields containing head position data and a number of data fields, the method of self-testing the MR head comprising the steps of:

sensing a read signal with the MR head from erased data fields;

generating an error signal from the read signal;

detecting voltage baseline jumps in the error signal;

determining a polarity of each voltage baseline jump; and determining the existence of MR head instability based on whether the polarities of the voltage baseline jumps are single polarity or dual polarity.

13. The method of claim 12 wherein the step of sensing the read signal comprises the steps of:

setting MR head sense current to a predetermined value;

sensing a nominal data signal from the MR head; and holding a gain control value constant at a previously calibrated value.

14. In a disk drive including a disk and a magneto-resistive head, a method of testing the head comprising:

reading from the disk using the head to generate a read signal;

detecting voltage baseline jumps in the read signal; and determining whether the head is unstable based on polarities of the voltage baseline jumps, wherein the head is determined to be unstable if the voltage baseline jumps have dual polarity, and the head is determined to be stable if the voltage baseline jumps have a single polarity.

15. The method of claim 14 wherein the disk is rotating during reading from the disk.

16. The method of claim 14 wherein the disk is stationary during reading from the disk.

17. The method of claim 14 wherein the head is integrally mounted in a slider.

18. The method of claim 14 wherein the head is determined to have Barkhausen noise or dielectric breakdown if the voltage baseline jumps have dual polarity, and the head is determined to have impacted the disk if the voltage baseline jumps have a single polarity.

19. The method of claim 14 wherein a count of voltage baseline jumps with positive polarity and a count of the voltage baseline jumps with negative polarity are stored in an error diagnostic register in the disk drive.

20. The method of claim 14 wherein the head is disqualified if the head is determined to be unstable, and the head is qualified if the head is determined to be stable.

21. In a disk drive including a disk and a magneto-resistive head, a method of testing the head comprising:

reading from the disk using the head to generate a read signal;

detecting voltage baseline jumps in the read signal;

counting how many of the voltage baseline jumps are more positive than a positive voltage threshold value to obtain a positive voltage baseline jump count;

counting how many of the voltage baseline jumps are more negative than a negative voltage threshold value to obtain a negative voltage baseline jump count;

determining the head is unstable if both of the counts are greater than zero; and determining the head is stable if one of the counts is greater than zero and the other of the counts is zero.

22. The method of claim 21 including determining the head has impacted the disk if one of the counts is greater than zero and the other of the counts is zero.

23. The method of claim 21 including maintaining history table in the disk drive of the counts taken at different times from different portions of the disk.

24. The method of claim 21 including disqualifying the head as unusable if the head is determined to be unstable.

25. The method of claim 21 including mapping out a portion of the disk as unusable if the head is determined to be stable.

* * * * *